(12) United States Patent
Earhart et al.

(10) Patent No.: US 11,687,598 B2
(45) Date of Patent: Jun. 27, 2023

(54) DETERMINING ASSOCIATIONS BETWEEN SERVICES AND COMPUTING ASSETS BASED ON ALIAS TERM IDENTIFICATION

(71) Applicant: MASTERCARD INTERNATIONAL INCORPORATED, Purchase, NY (US)

(72) Inventors: Steven Earhart, Kirkwood, MO (US); Leila Hassan, Ballwin, MO (US); James J. Arnott, Ballwin, MO (US); Paul Christopher Teiber, Lake St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 561 days.

(21) Appl. No.: 16/730,593

(22) Filed: Dec. 30, 2019

(65) Prior Publication Data

US 2021/0200819 A1 Jul. 1, 2021

(51) Int. Cl.
*G06F 16/93* (2019.01)
*G06N 5/04* (2006.01)
*G06N 20/00* (2019.01)

(52) U.S. Cl.
CPC ............... *G06F 16/93* (2019.01); *G06N 5/04* (2013.01); *G06N 20/00* (2019.01)

(58) Field of Classification Search
CPC ........... G06F 16/93; G06N 20/00; G06N 5/04
USPC ......................................................... 707/750
See application file for complete search history.

(56) References Cited

U.S. PATENT DOCUMENTS

| 2018/0024901 A1* | 1/2018 | Tankersley | G06T 11/206 |
| | | | 707/694 |
| 2018/0082183 A1* | 3/2018 | Hertz | G06N 5/00 |
| 2019/0095478 A1* | 3/2019 | Tankersley | G06F 11/30 |

\* cited by examiner

*Primary Examiner* — Hosain T Alam
*Assistant Examiner* — Nicholas E Allen
(74) *Attorney, Agent, or Firm* — Barta, Jones & Foley, PLLC (57) ABSTRACT

The disclosure herein describes determining computing assets associated with a service. Metadata from one or more computing assets of a computing system is collected. One or more alias terms are identified in the collected metadata of the one or more computing assets, wherein the alias terms are associated with the service. Service association scores are generated for the one or more computing assets based on the identified one or more alias terms and a term-score mapping. Each service association score indicates a likelihood that a computing asset is used for a service. A subset of computing assets of the one or more computing assets is identified. The subset of computing assets includes computing assets with service association scores that exceed a service association threshold. Computing assets of the service are identified based on the identified subset, thereby reducing the need for manual identification of asset-service associations.

20 Claims, 5 Drawing Sheets

DETERMINING ASSOCIATIONS BETWEEN SERVICES AND COMPUTING ASSETS BASED ON ALIAS TERM IDENTIFICATION

BACKGROUND

Distributed computing systems provide increased flexibility and power for performing many different functions in modern computing ecosystems. However, through the use of a wide variety of different computing assets, the complexity of managing such systems has increased substantially. Services that are provided by a distributed computing system may make use of and/or store data on many different server devices within the system. Tracking the influences and/or effects of such services across the assets of the distributed computing system is increasingly difficult, and responding efficiently to events that require knowledge of all assets related to a service or services present a significant challenge. For instance, the complexity of services distributed across a computing system of multiple assets complicates processes such as service and/or server maintenance or updating, as well as responding to errors or malfunctions within the system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for determining computing assets associated with a service is described. Metadata from one or more computing assets of a computing system is collected. One or more alias terms are identified in the collected metadata of the one or more computing assets, wherein the one or more alias terms are associated with the service. Service association scores are generated for the one or more computing assets based on the identified one or more alias terms and a term-score mapping, wherein each service association score indicates a likelihood that a computing asset is used for a service. A subset of computing assets of the one or more computing assets is identified, wherein the subset of computing assets includes computing assets with service association scores that exceed a service association threshold, whereby computing assets of the service are identified based on the identified subset.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized method and system for determining computing assets associated with a service. Metadata from computing assets of a distributed computing system, such as server devices, is collected. Alias terms that are associated with a service are identified in the collected metadata of the computing assets and service association scores are generated for the computing assets based on the identified alias terms and a term-score mapping. Each generated service association score indicates a likelihood that a computing asset is used for a service. A subset of the computing assets is identified including computing assets with service association scores that exceed a service association threshold, whereby computing assets of the service are identified based on the identified subset.

The disclosure addresses the challenges of determining and tracking which services use which server devices in a distributed computing system, among other challenges. The associations that are determined by the disclosure may then be used for a variety of purposes, such as maintenance of the services and/or server devices of the system, response to errors or alerts, and efficient clean up of leftover service artifacts that are no longer in use. The disclosure operates in an unconventional way at least in that it identifies the presence or association of a service with a server by analyzing the metadata text for keywords, or "alias terms", that tend to indicate association with the service. When a sufficient number of alias terms are identified in server metadata, there is substantial certainty that the server is associated with the service in some way. The use of the described alias term identification enables the process of determining a service association to a server to be automated in such a way that it can be efficiently and accurately performed by a computer. Further, the alias terms are mapped to different weights because each alias term does not necessarily indicate an association with the same certainty. The inclusion of weighted score values for each alias term makes the disclosure extremely flexible for the initial configuration and also enables tuning of the process over time using feedback to the determination and machine learning or other similar techniques. Additionally, the weights of alias terms may be determined automatically using term frequency-inverse document frequency (TFIDF) analysis or the like. Aspects of the disclosure significantly reduce the need for users to manually analyze metadata of a large quantity of servers or otherwise futilely chase down information that might indicate an association between services and servers of a distributed computing system.

Figure 1:
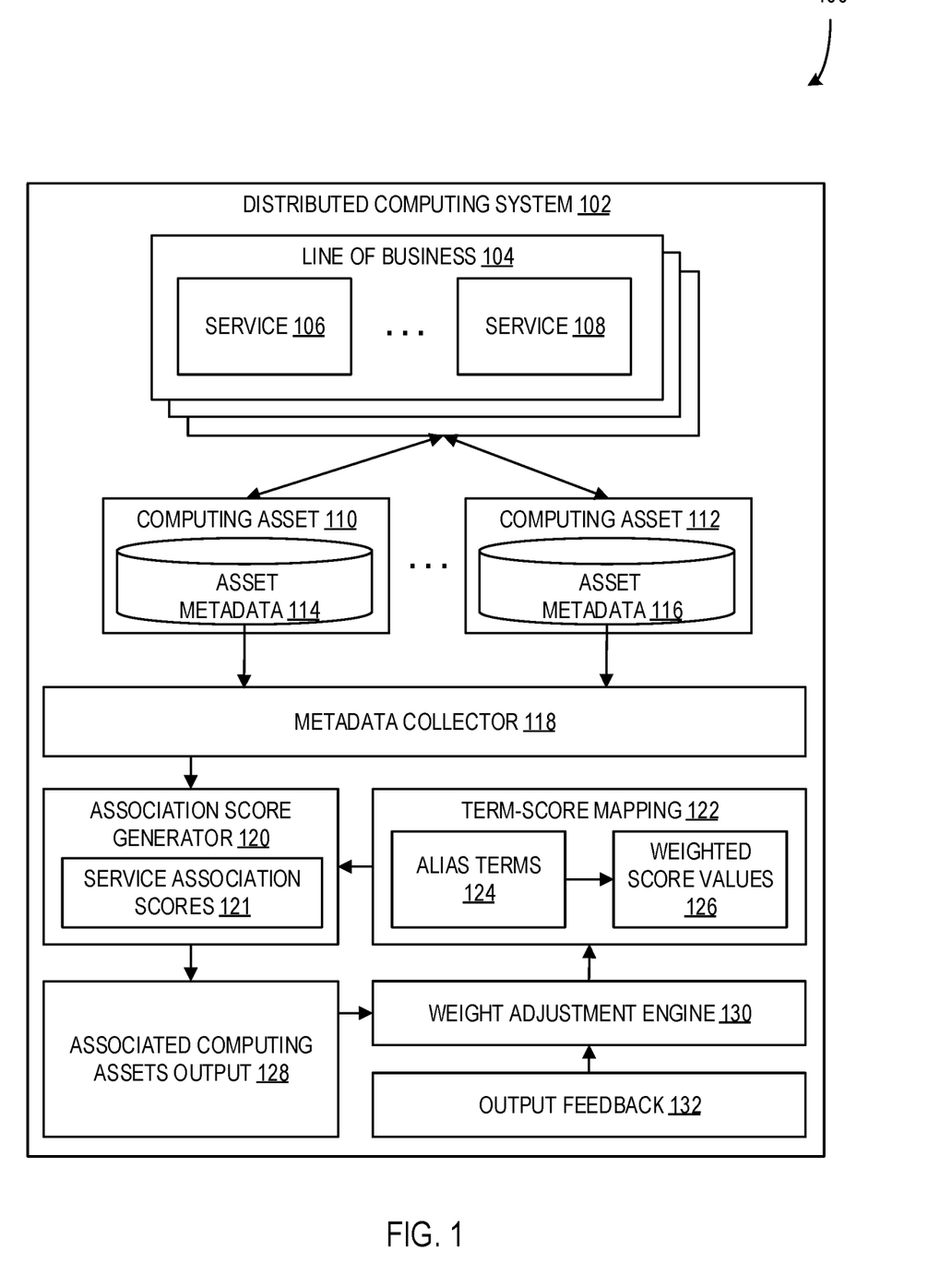
FIG. 1 is a block diagram illustrating a system configured for determining computing assets associated with services in a distributed computing system according to an embodiment.

FIG. 1 is a block diagram illustrating a system 100 configured for determining computing assets 110-112 associated with services 106-108 in a distributed computing system 102 according to an embodiment. The distributed computing system 102 includes services 106-108 associated with one or more lines of business 104. Each service 106-108 is executed by or otherwise makes use of some or all of the computing assets 110-112 during operation on the distributed computing system 102. Further, each of the computing assets 110-112 includes asset metadata 114-116, respectively.

In some examples, the services 106-108 are web services or other computer-based services that are provided for use by users and/or other computer applications. Such services may include serving information to other application upon request, receiving and storing data, processing messages, analyzing data, manipulating data, etc. It should be understood that the services 106-108 may include any kinds of computer-based services as would be understood by a person of ordinary skill in the art without departing from the description herein.

Further, groups of the services 106-108 are grouped or organized by lines of business 104 (LOBs). In some examples, the distributed computing system 102 is configured to support a plurality of different lines of business 104 without departing from the description herein. The services 106-108 of a line of business 104 may be configured to perform operations that are associated with and/or further the goals of the line of business 104. Lines of business 104 are logical and/or organizational divisions associated with business or other activities and may include, for instance, customer service-based services, backend data management-based services, online transaction processing services, authentication services, loyalty and benefit management services, customer facing web applications, finance systems, supply chain systems, etc.

In some examples, each service 106-108 is executed on and/or makes use of one or more of the computing assets 110-112 of the distributed computing system 102. The computing assets 110-112 include at least server devices of the computing system 102, but the assets 110-112 may also include other hardware, firmware, and/or software components of the system 102 that are used by or with the services 106-108 and that include asset metadata 114-116 that can be used by the system as described herein. For instance, in addition to servers that execute software of services 106-108, the computing assets 110-112 also include hardware devices that enable network communications with the servers, such as modems, switches, or the like. Further, computing assets 110-112 may also include software-based platforms that are used by the services 106-108, such as virtualization platforms or the like.

The asset metadata 114-116 of the computing assets 110-112 includes metadata of the operating systems and other software stored on the computing assets 110-112 and associated with the software being run on the computing assets 110-112 or otherwise making use thereof. For instance, in an example, the asset metadata 114-116 includes filenames, filesystem details, and process status data of the respective computing assets 110-112. It should be understood that more, fewer, and/or different types of metadata may be included in the asset metadata 114-116 in other examples without departing from the description herein.

The distributed computing system 102 further includes a metadata collector 118, an association score generator 120, and a term-score mapping 122 configured for use in determining associations between the services 106-108 and the computing assets 110-112 as described herein. The metadata collector 118 includes hardware, firmware, and/or software configured to collect the asset metadata 114-116 of the computing assets 110-112 and provide the collected metadata to the association score generator 120 for use therein. In some examples, the metadata collector 118 includes a process or processes that accesses each computing asset 110-112 and reads the asset metadata therein. Further, the collector 118 may include separate processes for accessing and/or collecting different types of metadata. For instance, the collector 118 includes processes configured to read the process status data of a computing asset and collect the metadata as it is read and other processes configured to read the filesystem structure of the computing asset. Additionally, or alternatively, the metadata collector 118 may be configured to use application program interfaces (APIs) or other interfaces of the computing assets 110-112 to collect the metadata therefrom when possible. In further examples, the metadata collector 118 is configured to run command line interface (CLI) commands to access and collect the metadata (e.g., Bourne Again Shell (BASH) commands such as "ps" for process status or "df" for filesystem data).

In some examples, different types of metadata collected by the metadata collector 118 are organized by the collector 118 based on the computing asset with which the metadata is associated (e.g., process status metadata and filesystem metadata collected from the computing asset 110 are stored together). The metadata collector 118 may be configured to organize the metadata in a format that enables efficient analysis by the association score generator 120 as described herein. Some exemplary formats are described in greater detail below with respect to FIG. 2.

The association score generator 120 includes hardware, firmware, and/or software configured to generate service association scores 121 for computing assets based on the asset metadata and the term-score mapping 122 and to generate associated computing assets output 128 based on the generated service association scores 121. The term-score mapping 122 used by the association score generator 120 includes mappings of alias terms 124 to weighted score values 126, such that, when the association score generator 120 identifies an alias term 124 in the collected asset metadata, the mapped weighted score value 126 is included in the service association score 121 of the computing asset associated with the asset metadata. For example, an alias term of "abc" is defined as being associated to service 106 and the term is mapped to a weighted score value of two. The association score generator 120 identifies the term "abc" in the asset metadata 114 of the computing asset 110 and so the weighted score value of two is included in a service association score 121 associated with the service 106 and the computing asset 110.

Each alias term-weighted score value mapping in the term-score mapping 122 is associated with a particular service, such that the alias term is a term that indicates association with the service with some degree of certainty. The mapped weighted score value of the alias term is a value defined based on that degree of certainty (e.g., the weighted score value has a greater weight and/or value if the alias term indicates an association with a high degree of certainty and/or the weighted score value has a lower weight and/or value if the alias term indicates an association with a lower degree of certainty).

In some examples, each alias term 124 is a keyword, string of characters, or other grouping of data associated with a service. For instance, if a service is called "Priceless Cities", some alias terms for the service may include "PC", "priceless", "PricelessCities", and/or "priceless_cities". The processes and data associated with the execution and operations of the service are named upon instantiation or initial storage and the names of those associated elements are included in the asset metadata of the computing asset upon which the processes and/or data are executed and/or stored (e.g., a main process for the "Priceless Cities" service is named "priceless_main"). Alias terms 124 for a service may be defined manually by an engineer or other user with knowledge of the names and/or other common strings or data sets that appear in the metadata of the service. Such users may also initial assign the weighted score values 126 to those alias terms 124 based on their knowledge.

Alternatively, or additionally, the alias terms and mapped weighted score values may be determined based on algorithmic or otherwise computer-based data analysis of metadata known to be associated with a service. In some examples, the alias terms 124 are identified and associated weight score values 126 assigned based on term frequency-inverse document frequency (TFIDF) analysis. Such analysis is used to identify potential alias terms 124 in a set of asset metadata that are frequently found in asset metadata of computing assets known to be associated with a service but infrequently found in an asset metadata of computing assets generally. For instance, the alias term, "PC", may be frequently identified in the metadata of assets that re used by the "Priceless Cities" service, such that the term frequency is high, but "PC" may also be frequently identified in metadata of assets throughout the system, such that "PC" as an alias term is of limited use in identifying assets that are specifically associated with the "Priceless Cities" service. Alternatively, the alias term, "priceless_cities", may occur with less frequency than "PC" in metadata associated with the Priceless Cities service, but if "priceless_cities" is not found or found with low frequency elsewhere in the metadata of the assets throughout the system generally, it is a stronger indicator that the assets upon which "priceless_cities" is found are associated with the Priceless Cities service in some way. As a result of this analysis, the "PC" alias term is assigned a lower weighted score value 126 than the "priceless_cities" alias term. Alternatively, if the "PC" alias term is too common throughout the system metadata, it may not be used as an alias term for the Priceless Cities service. It should be understood that the TFIDF analysis and/or other similar data analysis techniques known to a person of ordinary skill in the art may be used to identify and/or define alias term-weighted score value pairs in any known manner without departing from the description herein.

In some examples, the association score generator 120 is configured to read the asset metadata 114-116 received from the metadata collector 118 and identify any instance of the alias terms 124 associated with a service or services. For each identified alias term 124, the association score generator 120 includes the mapped weighted score value 126 of the identified alias term 124 in the service association score 121 that is being generated with respect to the computing asset 110-112 from which the metadata was collected. Such a combination may be in the form of adding the weighted score value 126 to a running total value, multiplying a value by the weighted score value 126, or another known combination method without departing from the description herein. Upon identifying all the instances of alias terms 124 in the asset metadata 114-116 and including all the mapped weighted score values 126 thereof, the resulting service association score 121 is generated. Such a score 121 is indicative of the likelihood that the computing asset associated with the metadata analyzed is associated with or used for or by the service with which the identified alias terms are associated.

In further examples, the mappings of alias terms 124 to weighted score values 126 further include context how and/or where in the asset metadata the alias terms 124 are identified. For instance, if an alias term is identified as a name of a file or part of a name of a file, the mapped weighted score value 126 may be different than if the same alias term is identified in the middle of a text body of a file (e.g., the file name identification may have a higher weighted score value as it is more indicative of a relationship than an identification of the term in the middle of a text body of a file, which is more likely to be coincidental). Such context differences may be represented in the term-score mapping 122 by storing multiple entries for alias terms 124 that map to different weighted score values 126, and upon identification of an alias term, the association score generator 120 evaluates the context of the identification and chooses the correct entry of that alias term based on the evaluation. In an example, an alias term 124 may have a first entry for file name identification context, a second entry for configuration settings context, and/or a third entry as a "default" context that covers for all other identifications. Other combinations of context for identifications may be used for each alias term 124 without departing from the description herein.

In some examples, the association score generator 120 generates service association scores 121 for each computing asset-service combination. For instance, if there are five server computing assets and ten services being analyzed, the association score generator 120 calculates ten service association scores 121 for each of the five server computing assets, one score for each service. Alternatively, or additionally, the association score generator 120 may be configured to generate service association scores 121 for subsets of the computing assets 110-112, subsets of the services 106-108, or any combination thereof without departing from the description herein. In further examples, metadata collector 118 and the association score generator 120 are configured to collect up-to-date asset metadata and generate up-to-date service association scores 121 respectively repeatedly based on a defined interval (e.g., metadata is collected and score generated every day). Alternatively, or additionally, the system is configured to provide an interface that enables users or other applications to submit requests for associated computing assets output 128 to be provided based on selected subsets of services and/or computing assets as described herein.

The generated service association scores 121 and other associated information are provided by the association score generator 120 as associated computing assets output 128. In some examples, the associated computing assets output 128 is in the form of a grid, list, or other similar format providing identifying information about the services 106-108 and computing assets 110-112 and the associated service association scores 121. Such output 128 may be ordered by relative service association score 121, such that the computing assets most likely to be associated with a service are listed at the top or other first in the output 128. Further, in some examples, the association score generator 120 includes a service association threshold or thresholds (e.g., separately defined thresholds for different services) that are used to filter the service association scores 121 when providing the associated computing assets output 128. For instance, a service association threshold associated with the service 106 is set at 100 and, upon generation of the service association scores 121 by the association score generator 120, only three of the ten computing assets 110-112 exceed a "100" service association score 121. As a result, the associated computing assets output 128 associated with the service 106 includes a list of the three computing assets 110-112 with scores 121 that exceed the threshold of 100 in order from highest score 121 to lowest score 121. Such thresholds may be set by users with knowledge of the services and/or other components of the system as a minimum required level for a computing asset to be considered "associated" with a service and may serve to eliminate weak associations, falsely determined associations, or the like while increasing the readability and/or usefulness of the associated computing assets output 128.

The distributed computing system 102 further includes a weight adjustment engine 130. The weight adjustment engine 130 includes hardware, firmware, and/or software configured to receive or obtain the associated computing assets output 128 and output feedback 132 and use that data to adjust weights of the weighted score values 126 to improve the accuracy of the service association scores 121 generated by the association score generator 120 in future operations. In some examples, the weight adjustment engine 130 is configured to perform machine learning analysis and/or operations to make adjustments to the weighted score values 126 as described herein. For instance, in some examples, the weight adjustment engine 130 includes a machine learning module that comprises a trained regressor such as a random decision forest, a directed acyclic graph, a support vector machine, a convolutional neural network or other neural network, or another trained regressor. Such a trained regressor may be trained using the associated computing assets output 128 and/or output feedback 132 as feedback data. It should further be understood that the machine learning module, in some examples, operates according to machine learning principles and/or techniques known in the art without departing from the systems and/or methods described herein. In further examples, the machine learning module of the weight adjustment engine 130 engages in supervised training wherein training data is used to determine weighted score values 126 and/or adjustments to be made to weighted score values 126. Additionally, or alternatively, the machine learning module is configured to use active learning techniques based on defined filtering criteria to enable efficient training with reduced, filtered training sets for particular types of asset metadata and alias terms. In an example, the machine learning module of the weight adjustment engine 130 makes use of training data pairs when applying machine learning techniques and/or algorithms. Millions of training data pairs (or more) may be stored in a machine learning data structure. In some examples, a training data pair includes a timestamp-based feedback data value from the output feedback 132 or other similar data paired with a weight adjustment value. The pairing of the two values demonstrates a relationship between the feedback data value and the adjustment values that may be used by the machine learning module to determine future weight adjustments according to machine learning techniques and/or algorithms.

In some examples, the output feedback 132 is received from users that review the associated computing assets output 128. The users may provide feedback indicating whether the associations identified in the output 128 are accurate and/or whether the output 128 was useful. For instance, a user may request the system to identify the computing assets that are used to run the service 106 so that the user can perform an update process on the service. The system identifies and provides a subset of computing assets in the associated computing assets output 128 for which sufficiently high service association scores 121 were generated, and the user proceeds to use the output 128 as a guide when performing the update process. If, during that process, the user notices that one of the indicated computing assets is actually not associated with the service 106, the user may provide output feedback 132 to the system indicating that the provided output 128 was inaccurate. Such feedback may be used by the weight adjustment engine 130 to adjust the weighted score values 126 for one or more alias terms 124 of the service 106 down in order to avoid similar inaccuracies in future calculations.

Alternatively, or additionally, the output feedback 132 may be provided by interactions with other applications or processes. For instance, the associated computing asset output 128 may be provided to an alert application that uses the service association information to provide informative alerts to users that are responsible for the functionality of services. If the associated computing assets output 128 provided to the alert application is found to be inaccurate based on a process of the alert application (e.g., the alert application may have access to information associated with the service that is not available to the metadata collector 118), the alert application may be configured to automatically send an exception or other feedback message to the weight adjustment engine 130 as output feedback 132.

In some examples, the associated computing assets output 128 of the system is used by other applications or users to perform operations or otherwise manage the distributed computing system 102. Further, the information provided in the output 128 may be further analyzed or used to identify other associations, such as services that tend to use similar subsets of the computing assets 110-112, relationships between performance of the computing assets 110-112 and the services 106-108 that use them, or the like. Further, in some instances, identifying the associations between computing assets and services may enable the identification of computing assets in the system that still expend resources (e.g., processing resources and/or data storage resources) for services that no longer need to use those computing assets, enabling users to clean up such orphaned processes and/or data.

Figure 2:
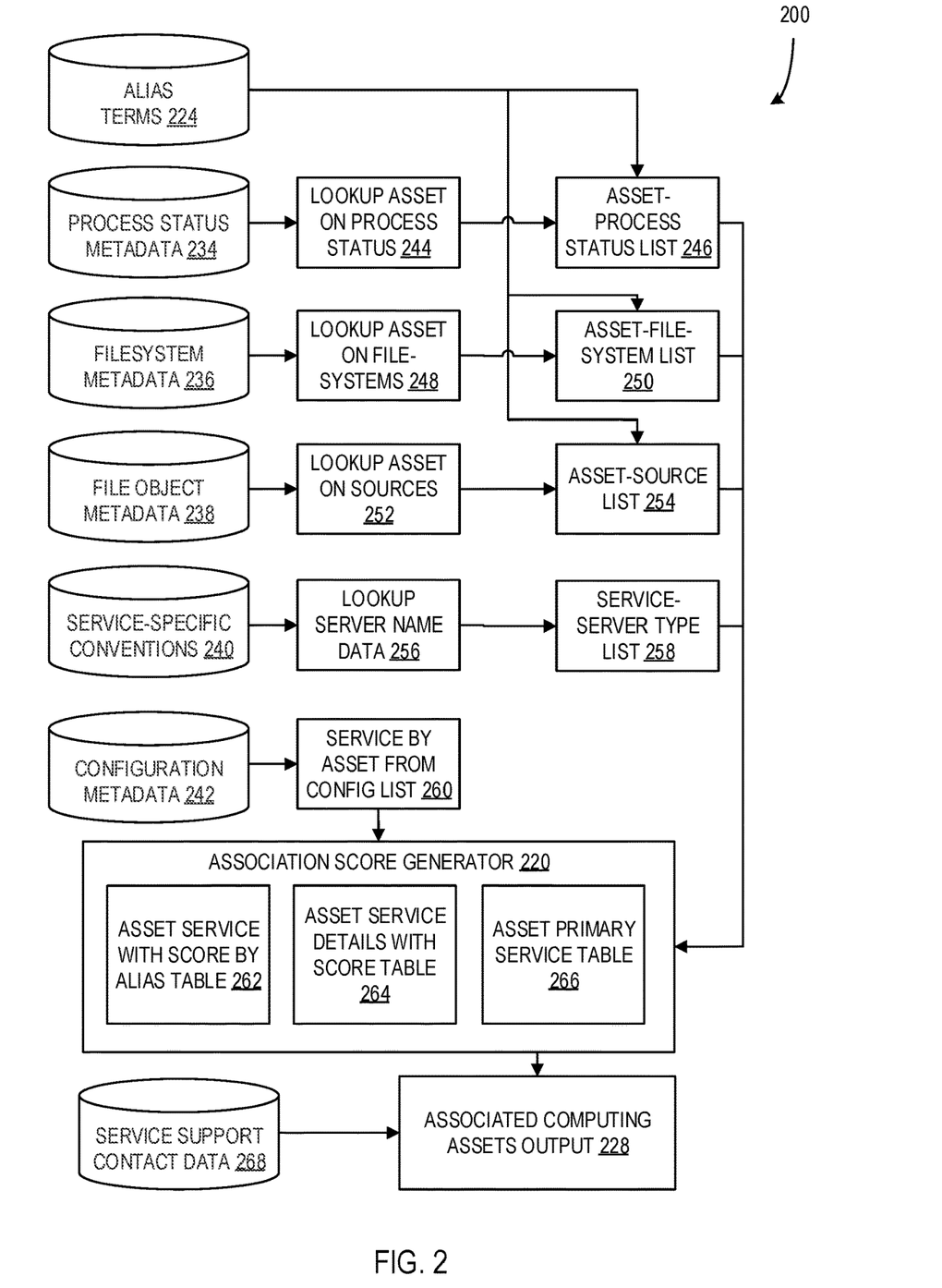
FIG. 2 is a block diagram illustrating a system processes for analyzing asset metadata according to an embodiment.

FIG. 2 is a block diagram 200 illustrating a system processes for analyzing asset metadata according to an embodiment. The asset metadata of the system (e.g., asset metadata 114-116 of FIG. 1) includes process status metadata 234 (e.g., collected via a "ps" command on each asset), filesystem metadata 236 (e.g., collected via a "df" command on each asset), file object metadata 238 (e.g., collected via a "tstats" command in a SPLUNK application for each asset or collected via "ls" command on each asset), service-server metadata and/or service-specific conventions 240 (e.g., naming conventions of servers, IP address ranges of devices, etc. that are associated with a specific device), and configuration metadata 242 (e.g., from a configuration management database (CMDB)). It should be understood that, in other examples, more, fewer, and/or different types of metadata may be used during the described processes without departing from the description herein.

Further, lookup processes 244, 248, 252, and 256 are performed on the metadata as illustrated, such that the metadata is read and arranged as described herein. A "lookup asset on process status" process 244 is performed on the process status metadata 234 to create an asset-process status list 246, which is a formatted list that includes and/or describes the process status metadata associated with each computing asset (e.g., each host server asset includes a plurality of processes and the process status information of each of those processes is linked with the host server upon which the processes are running in the asset-process status list).

Similarly, a "lookup asset on filesystems" process 248 is performed on the filesystem metadata 236 to create an asset-filesystem list 250, which is a formatted list that includes and/or describes the filesystem structures and other metadata associated with each computing asset. A "lookup asset on file objects" process 252 functions similarly to create an asset-source list 254 from the file object metadata 238.

Each of the lists 246, 250, and 254 are combined with the alias terms 224 by the association score generator 220 in the generation of the service association scores as described herein. The lists 246, 250, and 254 include the metadata of the computing assets that is matched to the known alias terms 224. As described above, upon identifying a service alias term 224 in the metadata of one of the lists, a weighted score value associated with the identified service alias term 224 is included in a service association score that describes the relationship between the service with which the identified service alias term 224 is association and the asset with which the matching metadata is associated. In some examples, the alias terms 224 are stored in a table or list that describes the association between each alias term 224 and an association service (e.g., a table with a row for each alias term and columns for the unique alias term identifier and a service identifier).

A "lookup server name data" process 256 is performed on the service-specific conventions 240 to create a service-server type list 258, which is a formatted list that includes and/or describes the relationship between services and server assets based on the type, name, and/or prefix of the server. Further, a "service by asset from config" list 260 is created based on the configuration metadata 242. Each of the lists 258 and 260 are provided to the association score generator 220 for use in determining associations between services and assets as described herein. The metadata on these lists may be used by the association score generator 220 as context information and/or in the calculation of the service association scores. For instance, if the configuration metadata 242 indicates an asset is in use by a service, that association may be considered to be known prior to calculation of a service association score. The service association score may then be calculated to determine the asset's importance to the service relative to other assets that are determined during association score calculation. Similarly, a link between a service and an asset may be derived from the service-server type list 258 prior to or during the generation of service association scores, such that the derived link may be used as confirmation that the service and asset are associated. Alternatively, or additionally, such context information from the service-server type list 258 and the service by asset from config list 260 may be associated with weighted score values and included in the generated service association scores as described herein.

Upon generation of service association scores by the association score generator 220, the resulting score-based relationship data is stored in three tables with different organizations of the data. The asset metadata and associated scores organized by alias term are stored in the "asset-service with score by alias" table 262. The table 262 includes rows that include asset identifiers, alias term identifiers, service identifiers, and other asset metadata such as the number of filesystems, the number of processes, and the number of sources, as well as the weighted score value associated with the alias term identifier of the row. The "asset-service details with score" table 264 is generated to include rows with asset identifiers and associated services and scores based on the service association scores and data of the table 262. In an example, the table 264 includes, for each asset, an infrastructure service identifier and associated service association score, a product line service identifier and associated service association score, and a shared service identifier and associated service association score. The associated service score is generated as described above and based on the recorded weighted score values of the rows of table 262. The "asset primary service" table 266 uses the data of the table 264 to provide the "primary service" for each asset. Each row of the table 266 includes an asset identifier and a primary service identifier. In some examples, the primary service identifier is the service identifier of the service with the highest service association score in the table 264. Alternatively, or additionally, the table 266 may include rows for services that are not "primary services" of any asset, with such rows indicating the asset that has the highest service association score with the service, or the "primary asset" of the service. Alternatively, such information may be provided in a separate table from table 266.

In some examples, the data of the tables 262, 264, and/or 266 is provided in the associated computing assets output 228 as described herein. The data may further be combined with service support contact data 268 (e.g., email addresses or other contact methods for parties that are responsible for each of the services). Such output data may be used to ensure that the appropriate party or parties are contacted in the event of a computing asset failure or malfunction (e.g., the malfunction asset may be identified in the table 264 and associated services with sufficiently high service association scores with that asset may be highlighted and the parties associated with those services may be alerted about the malfunction).

Figure 3:
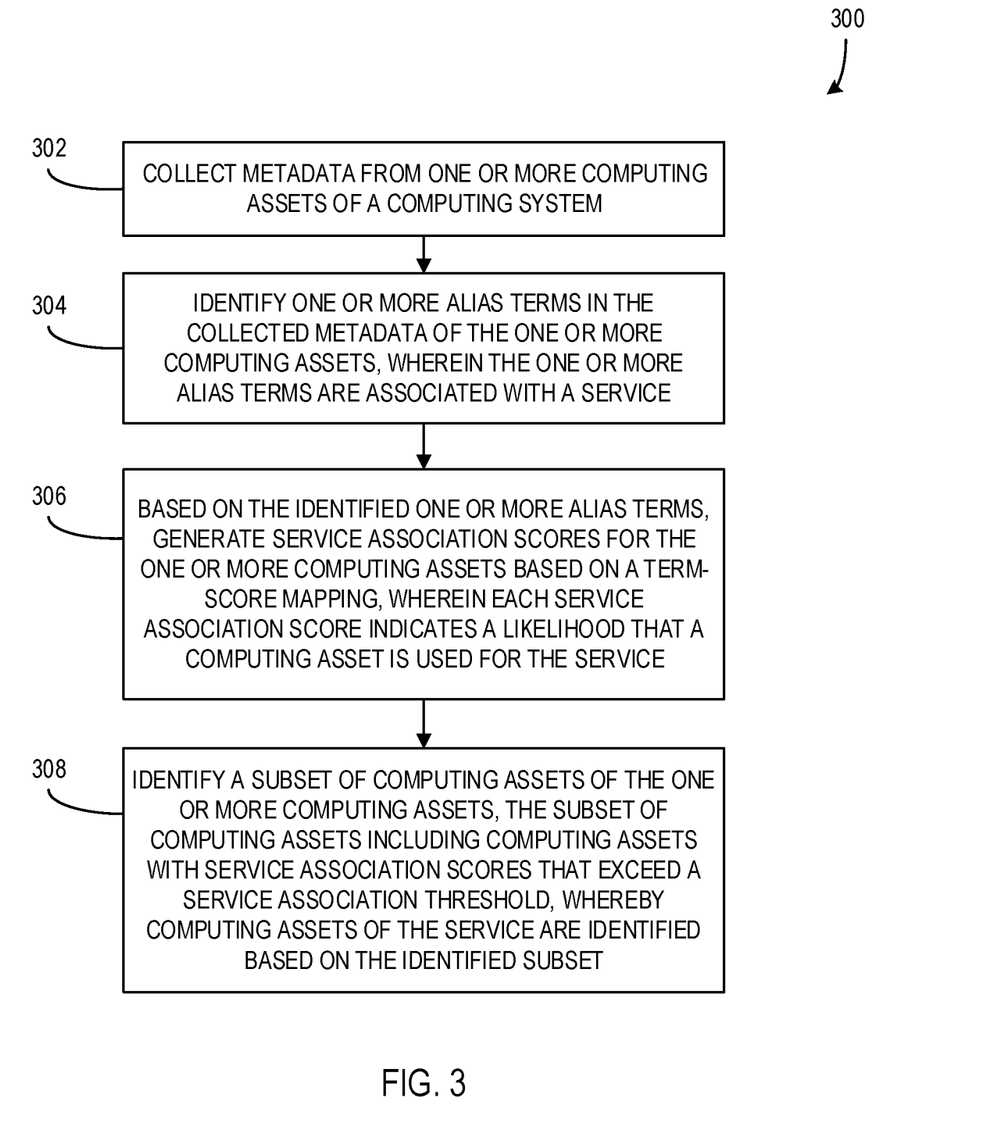
FIG. 3 is a flow chart illustrating a method of determining computing assets associated with a service according to an embodiment.

FIG. 3 is a flow chart illustrating a method 300 of determining computing assets associated with a service according to an embodiment. In some examples, the method 300 is performed by a system such as system 100 of FIG. 1. At 302, metadata is collected from one or more computing assets of a computing system. In some examples, the collection of the metadata is performed by one or more metadata collector components (e.g., metadata collector 118). Metadata collected may include metadata of various types, such as process status metadata 234, filesystem metadata 236, file object metadata 238, service-specific conventions 240, and/or configuration metadata 242 of FIG. 2, described above. Alternatively, or additionally, the collected metadata may include more, fewer, or different types of metadata without departing from the description herein. In further examples, the collected metadata may be organized or arranged into lists, tables, or other data structures (e.g., lists 246, 250, 254, and 258 of FIG. 2).

At 304, one or more alias terms associated with a service are identified in the collected metadata of the one or more computing assets. In some examples, identifying the alias terms includes reading the various metadata data structures and comparing the character strings or other data of the metadata with the alias terms as described above with respect to FIG. 2.

At 306, based on the identified one or more alias terms, service association scores for the one or more computing assets are generated based on a term-score mapping. Each service association score that is generated indicates a likelihood that a computing asset is used for the service. In some examples, generating the service association scores for the one or more computing assets includes combining weighted score values (e.g., weighted score values 126) of the term-score mapping (e.g., term-score mapping 122) for all alias terms (e.g., alias terms 124) that are identified in the metadata of the one or more computing assets respectively, as described above with respect to FIG. 1. Further, the generation of service association scores may include generating service association scores for the one or more computing assets based on alias terms of multiple services, such that each of the one or more computing assets has a generated service association score for each of the multiple services. A service for which a computing asset has the highest service association score in comparison to other services in relation to the computing asset may be considered the "primary service" of the computing asset, as described above in FIG. 2.

Alternatively, or additionally, the term-score mapping may include alias terms that are associated to a particular LOB instead of or in addition to being associated with a particular service. As a result, in some examples, generating service association scores includes generating association scores representing associations between computing assets and LOBs based on the identified alias terms. Such LOB-based association scores may be based only on identified alias terms of the LOB or they may further take into account the service association scores of the computing assets that are associated with services of the LOB in question.

At 308, a subset of computing assets of the one or more computing assets is identified, wherein the subset of computing assets includes computing assets with service association scores that exceed a service association threshold, whereby computing assets of the service are identified based on the identified subset. In some examples, the identified subset of computing assets further includes computing assets with sufficiently high service association scores for multiple services, such that the subset of computing assets describes the group of computing assets that are associated with a set of services. Such sets of services may be defined as the services that represent and/or are used by a particular LOB or group of LOBs of the system. Alternatively, or additionally, in examples where association scores are generated for LOBs as described above, the identified subset of computing assets includes computing assets with association scores that exceed association threshold associated with the LOBs, such that the computing assets are associated with the LOBs themselves.

Figure 4:
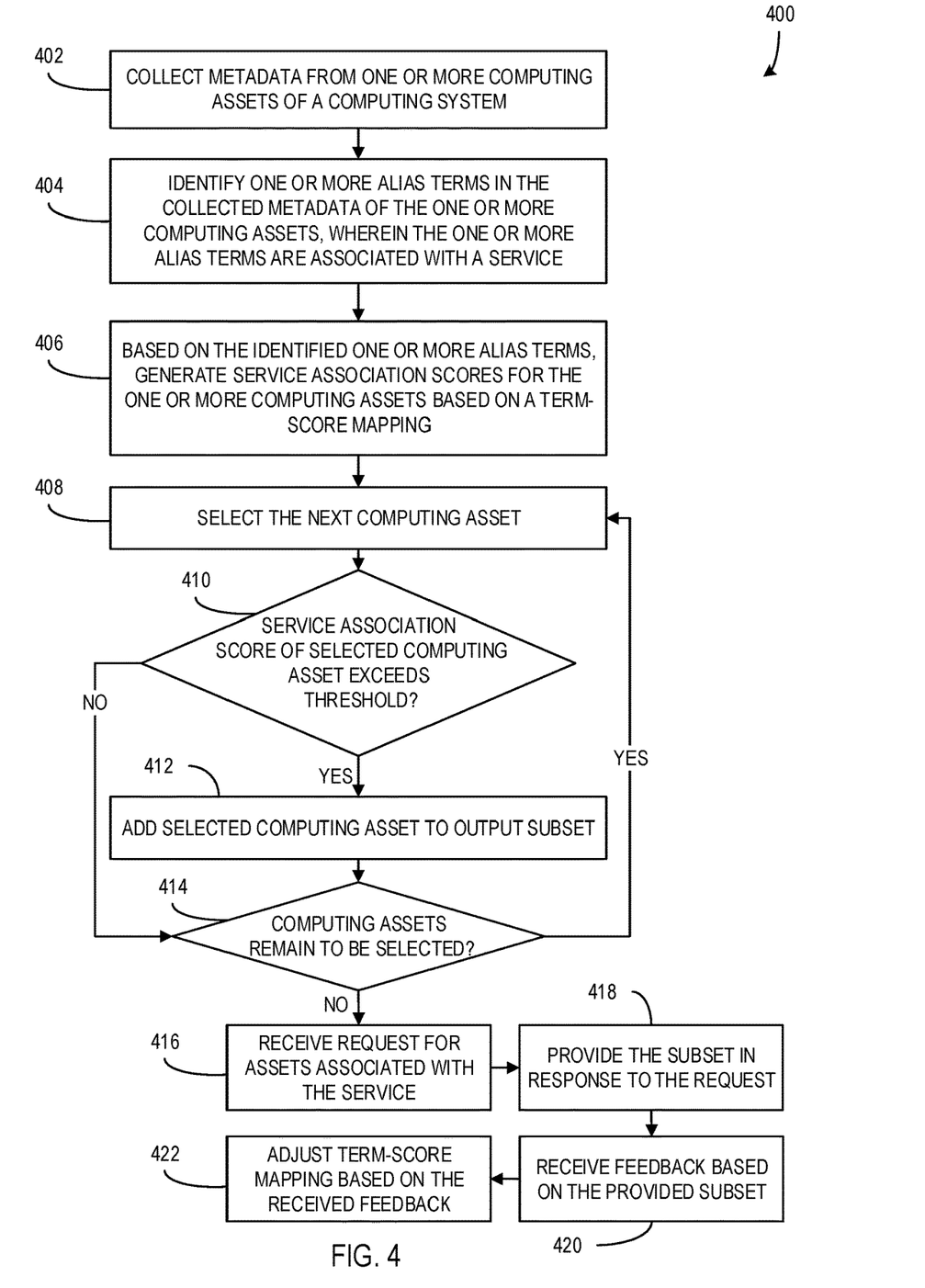
FIG. 4 is flow chart illustrating a method of generating a subset of computing assets associated with a service and providing the subset in response to a request according to an embodiment.

FIG. 4 is flow chart illustrating a method 400 of generating a subset of computing assets associated with a service and providing the subset in response to a request according to an embodiment. In some examples, the method 400 is performed by a system such as system 100 of FIG. 1. It should be understood that 402-406 of method 400 may be performed in substantially the same manner as 302-306 of method 300 described above with respect to FIG. 3.

At 408, the next computing asset of the one or more computing assets is selected. If 408 has not been performed before, then the first computing asset of the one or more computing assets is selected. At 410, if the service association score of the selected computing asset exceeds a defined threshold, the process proceeds to 412. If the service association score of the selected computing asset does not exceed the defined threshold, the process proceeds to 414.

At 412, the selected computing asset is added to the output subset of computing assets. In some examples, adding the selected computing asset to the output subset includes adding data associated with the computing asset to one or more tables that describe computing assets and their relationships or associations with the service or services (e.g., tables 262, 265, and/or 266 of FIG. 2).

At 414, if computing assets of the one or more computing assets remain to be selected, the process returns to 408 to select the next computing asset. Alternatively, if no computing assets of the one or more computing assets remain to be selected, the output subset is complete and the process proceeds to 416.

At 416, a request is received for assets that are associated with the service. It should be understood that, in some examples, the processes performed at 402-414 may be performed repeatedly and regularly based on a schedule, such that a received request at 416 may be received during an iteration of those processes. In some examples, the request for associated assets of the service includes an identifier of the service, while in other examples, the request includes other types of request data, such as types of metadata to include in the response to the request along with the information about the associated computing assets. The request may be received based on input from a user and/or based on automatic processes of other applications or software entities.

At 418, the output subset of computing assets is provided in response to the request. The information included in the output subset may be based on the types of information requested in the received request. In some examples, the output subset provided in response is a list of computing asset identifiers of the computing assets added to the output subset. In other examples, more metadata associated with the computing assets is provided, such as calculated service association scores for comparison of the different computing assets (e.g., the computing assets may be ordered from highest score to lowest score for comparison), alias terms that were identified in the metadata of each computing asset, etc. In further examples, more, fewer, or different data may be included in the response to the request without departing from the description herein. Providing such a response to the request may include sending the response to the sender of the request via an API or other interface and/or displaying the response on a user interface for viewing by a user.

At 420, after the subset is provided in response to the request, feedback based on that provided subset is received. In some examples, the feedback is provided by a user who received the subset and/or an application or other software entity that received the subset. The feedback may include positive feedback that confirms the accuracy of the provided subset and/or negative feedback that indicates that some or all of the provided computing asset information of the subset is inaccurate (e.g., a computing asset in the subset is not actually associated with the service or a computing asset that was found to be associated with the service was not added to the subset). At 422, the term-score mapping is adjusted based on the received feedback. Adjusting the term-score mapping may include changing the weighted score values associated with the alias terms that were used to generate the service association scores of the computing assets in the output subset. Alternatively, or additionally, adjusting the term-score mapping may include adding, removing, or changing alias terms in the term-score mapping. Further, if the term-score mapping includes context details for identifying alias terms, those context details may be adjusted as well. Such adjustments may be performed based on machine learning techniques as described above with respect to the weight adjustment engine 130 of FIG. 1.

Additional Example Scenarios

Aspects of the disclosure enable various additional scenarios, such as next described.

In an example, a distributed computing system is configured to execute a plurality of services using computing assets including a plurality of server devices. Once per day, a metadata collector module accesses the plurality of server devices and collects metadata from the servers associated with software being executed on the servers and/or files or other data stored on the servers. Upon the collection of the metadata, an association score generator module reads the metadata and identifies alias terms associated with the services in the metadata.

For each alias term identified, the association score generator determines an associated weighted score value based on a term-score mapping and includes the weighted score value in a service association score associated with the service and the server device. Based on this process, the association score generator generates a service association score for each possible service-server device pair. The generated service association scores are stored by the association score generator in several different tables with different organizations of the scores and the service and server device metadata.

A user sends a request to the system for information about what server devices are used by or otherwise associated with one of the services. The system receives the request and generates a response that includes service-server association data obtained from one or more of the tables of the association score generator. The association score generator creates the response by filtering the servers associated with the service in question based on a defined service association threshold, such that only server devices with service association scores that exceed the service association threshold are provided in the response. Further, the response is provided with the server device information in order from highest service association score to lowest service association score, enabling the user to efficiently compare the relative importance or impact of each server device on the service.

In another example, an alert application detects a malfunction in a server device of the system and requests information regarding services that make use of the server device, including contact information for responsible parties of the services. A response is generated based on the service association scores generated by the association score generator. The response includes a list of services for which the server device has a service association score that exceeds a service association threshold. The system further uses the service identifiers of the services in the list to look up responsible party contact information for each service and include the contact information in the list row for each associated service. The alert application receives the response and provides an automated alert to each of the responsible parties for the services that are associated with the malfunctioning server device.

Exemplary Operating Environment

Figure 5:
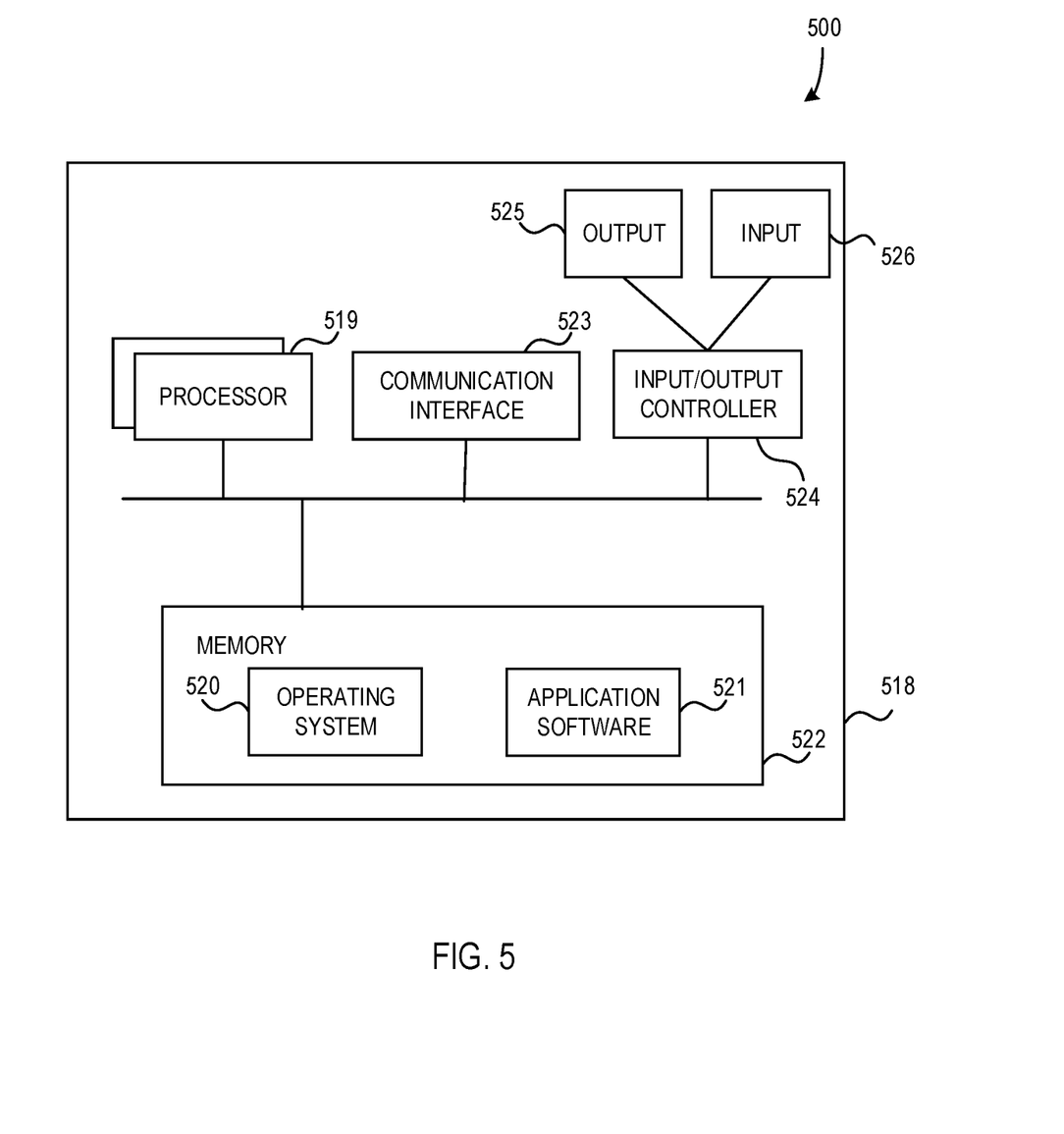
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hardcoded machine. Platform software comprising an operating system 520 or any other suitable platform software may be provided on the apparatus 518 to enable application software 521 to be executed on the device. According to an embodiment, generating a runbook definition and automatically performing runbook operations for an associated application based on evaluation of the runbook definition as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: collect metadata from one or more computing assets of a computing system; identify one or more alias terms in the collected metadata of the one or more computing assets, wherein the one or more alias terms are associated with the service; based on the identified one or more alias terms, generate service association scores for the one or more computing assets based on a term-score mapping, wherein each service association score indicates a likelihood that a computing asset is used for a service; and identify a subset of computing assets of the one or more computing assets, the subset of computing assets including computing assets with service association scores that exceed a service association threshold, whereby computing assets of the service are identified based on the identified subset.

A computerized method for determining computing assets associated with a service, the method comprising: collecting, by a processor, metadata from one or more computing assets of a computing system; identifying, by the processor, one or more alias terms in the collected metadata of the one or more computing assets, wherein the one or more alias terms are associated with the service; based on the identified one or more alias terms, generating, by the processor, service association scores for the one or more computing assets based on a term-score mapping, wherein each service association score indicates a likelihood that a computing asset is used for a service; and identifying, by the processor, a subset of computing assets of the one or more computing assets, the subset of computing assets including computing assets with service association scores that exceed a service association threshold, whereby computing assets of the service are identified based on the identified subset.

One or more non-transitory computer storage media having computer-executable instructions for determining computing assets associated with a service that, upon execution by a processor, cause the processor to at least: collect metadata from one or more computing assets of a computing system; identify one or more alias terms in the collected metadata of the one or more computing assets, wherein the one or more alias terms are associated with the service; based on the identified one or more alias terms, generate service association scores for the one or more computing assets based on a term-score mapping, wherein each service association score indicates a likelihood that a computing asset is used for a service; and identify a subset of computing assets of the one or more computing assets, the subset of computing assets including computing assets with service association scores that exceed a service association threshold, whereby computing assets of the service are identified based on the identified subset.

Alternatively, or in addition to the other examples described herein, examples include any combination of the following:

wherein the term-score mapping includes the one or more alias terms and a set of weighted score values, each weighted score value being mapped to one alias term of the one or more alias terms; and wherein the method further comprises: collecting, by the processor, service metadata associated with the service; and based on term frequency-inverse document frequency (TFIDF) analysis of the service metadata, assigning, by the processor, weighted score values to each alias term of the one or more alias terms in the term-score mapping.

further comprising: receiving, by the processor, feedback data associated with the identified subset of computing assets; and adjusting, by the processor, at least one weighted score value of the term-score mapping based on the received feedback using machine learning.

receiving, by the processor, a request for computing assets associated with the service; wherein identifying the subset of computing assets includes providing the subset of computing assets in response to the received request.

wherein the subset of computing assets is provided as an ordered list, the ordered list including the subset of computing assets in order from a highest service association score to a lowest service association score.

wherein collecting metadata from the one or more computing assets includes collecting up-to-date metadata periodically based on a metadata collection interval;

and wherein identifying the one or more alias terms in the collected metadata and generating the service association scores for the one or more computing assets based on the identified one or more alias terms are performed based on collecting the up-to-date metadata.

wherein the one or more alias terms are associated with a plurality of services of a line of business (LOB); wherein the term-score mapping is associated with the plurality of services of the LOB, such that each generated service association score indicates a likelihood that a computing asset is used for at least one service of the plurality of services of the LOB; and wherein identifying the subset of computing assets of the one or more computing assets includes identifying a subset of computing assets of the one or more computing assets, the subset of computing assets including computing assets with service association scores that exceed at least one service association threshold associated with the plurality of services of the LOB, whereby computing assets of associated with the LOB are identified based on the identified subset.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for collecting, by a processor, metadata from one or more computing assets of a computing system; exemplary means for identifying, by the processor, one or more alias terms in the collected metadata of the one or more computing assets, wherein the one or more alias terms are associated with the service; based on the identified one or more alias terms, exemplary means for generating, by the processor, service association scores for the one or more computing assets based on a term-score mapping, wherein each service association score indicates a likelihood that a computing asset is used for a service; and exemplary means for identifying, by the processor, a subset of computing assets of the one or more computing assets, the subset of computing assets including computing assets with service association scores that exceed a service association threshold, whereby computing assets of the service are identified based on the identified subset.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for determining computing assets associated with a service, the system comprising:
   at least one processor; and
   at least one memory comprising computer program code, the at least one memory and the computer program code configured to, with the at least one processor, cause the at least one processor to:
   collect metadata from one or more computing assets of a computing system;
   identify one or more alias terms in the collected metadata of the one or more computing assets, wherein the one or more alias terms are associated with the service;
   based on the identified one or more alias terms, generate service association scores for the one or more computing assets based on a term-score mapping, wherein each service association score indicates a likelihood that a computing asset is used for a service;
   identify a subset of computing assets of the one or more computing assets, which includes computing assets with service association scores that exceed a service association threshold;
   determine computing assets associated with the service based on the subset of computing assets;
   receive a request for computing assets associated with the service; and provide the subset of computing assets in response to the received request, wherein the subset of computing assets is provided as an ordered list, the ordered list including the subset of computing assets in order from a highest service association score to a lowest service association score.

2. The system of claim 1, wherein the term-score mapping includes the one or more alias terms and a set of weighted score values, each weighted score value being mapped to one alias term of the one or more alias terms; and
wherein the at least one memory and the computer program code is configured to, with the at least one processor, further cause the at least one processor to:
collect service metadata associated with the service; and
based on term frequency-inverse document frequency (TFIDF) analysis of the service metadata, assign weighted score values to each alias term of the one or more alias terms in the term-score mapping.

3. The system of claim 2, the at least one memory and the computer program code configured to, with the at least one processor, further cause the at least one processor to:
receive feedback data associated with the identified subset of computing assets; and
adjust at least one weighted score value of the term-score mapping based on the received feedback data using machine learning.

4. The system of claim 1, wherein collecting metadata from the one or more computing assets includes collecting up-to-date metadata periodically based on a metadata collection interval; and
wherein identifying the one or more alias terms in the collected metadata and generating the service association scores for the one or more computing assets based on the identified one or more alias terms are performed based on collecting the up-to-date metadata.

5. The system of claim 1, wherein the one or more alias terms are associated with a plurality of services of a line of business (LOB);
wherein the term-score mapping is associated with the plurality of services of the LOB, such that each generated service association score indicates a likelihood that a computing asset is used for at least one service of the plurality of services of the LOB; and
wherein identifying the subset of computing assets of the one or more computing assets includes identifying a subset of computing assets of the one or more computing assets, the subset of computing assets including computing assets with service association scores that exceed at least one service association threshold associated with the plurality of services of the LOB, whereby computing assets of associated with the LOB are identified based on the identified subset.

6. The system of claim 1, wherein the at least one memory and the computer program code is configured to, with the at least one processor, further cause the at least one processor to generate weighted score values for the identified one or more alias terms by performing a term frequency-inverse document frequency (TFIDF) analysis of the collected metadata, and wherein the term-score mapping is generated by mapping the alias terms to corresponding weighted score values.

7. The system of claim 1, wherein the at least one memory and the computer program code is configured to, with the at least one processor, further cause the at least one processor to provide the subset to an alert application that uses the service association scores and provides informative alerts to users that are responsible for functionality of the service.

8. A computerized method for determining computing assets associated with a service, the method comprising:
collecting, by a processor, metadata from one or more computing assets of a computing system;
identifying, by the processor, one or more alias terms in the collected metadata of the one or more computing assets, wherein the one or more alias terms are associated with the service;
based on the identified one or more alias terms, generating, by the processor, service association scores for the one or more computing assets based on a term-score mapping, wherein each service association score indicates a likelihood that a computing asset is used for a service; and
identifying, by the processor, a subset of computing assets of the one or more computing assets, that includes computing assets with service association scores that exceed a service association threshold;
determining computing assets associated with the service based on the subset of computing assets;
receiving a request for computing assets associated with the service; and
providing the subset of computing assets in response to the received request, wherein the subset of computing assets is provided as an ordered list, the ordered list including the subset of computing assets in order from a highest service association score to a lowest service association score.

9. The method of claim 8, wherein the term-score mapping includes the one or more alias terms and a set of weighted score values, each weighted score value being mapped to one alias term of the one or more alias terms; and
wherein the method further comprises:
collecting, by the processor, service metadata associated with the service; and
based on term frequency-inverse document frequency (TFIDF) analysis of the service metadata, assigning, by the processor, weighted score values to each alias term of the one or more alias terms in the term-score mapping.

10. The method of claim 9, further comprising:
receiving, by the processor, feedback data associated with the identified subset of computing assets; and
adjusting, by the processor, at least one weighted score value of the term-score mapping based on the received feedback data using machine learning.

11. The method of claim 8, further comprising:
generating weighted score values for the identified one or more alias terms by performing a term frequency-inverse document frequency (TFIDF) analysis of the collected metadata, and wherein the term-score mapping is generated by mapping the alias terms to corresponding weighted score values.

12. The method of claim 8, further comprising:
providing the subset to an alert application that uses the service association scores and provides informative alerts to users that are responsible for functionality of the service.

13. The method of claim 8, wherein collecting metadata from the one or more computing assets includes collecting up-to-date metadata periodically based on a metadata collection interval; and
wherein identifying the one or more alias terms in the collected metadata and generating the service association scores for the one or more computing assets based on the identified one or more alias terms are performed based on collecting the up-to-date metadata.

14. The method of claim 8, wherein the one or more alias terms are associated with a plurality of services of a line of business (LOB);
  wherein the term-score mapping is associated with the plurality of services of the LOB, such that each generated service association score indicates a likelihood that a computing asset is used for at least one service of the plurality of services of the LOB; and
  wherein identifying the subset of computing assets of the one or more computing assets includes identifying a subset of computing assets of the one or more computing assets, the subset of computing assets including computing assets with service association scores that exceed at least one service association threshold associated with the plurality of services of the LOB, whereby computing assets of associated with the LOB are identified based on the identified subset.

15. One or more non-transitory computer storage media having computer-executable instructions for determining computing assets associated with a service that, upon execution by a processor, cause the processor to at least:
  collect metadata from one or more computing assets of a computing system;
  identify one or more alias terms in the collected metadata of the one or more computing assets, wherein the one or more alias terms are associated with the service;
  based on the identified one or more alias terms, generate service association scores for the one or more computing assets based on a term-score mapping, wherein each service association score indicates a likelihood that a computing asset is used for a service; and
  identify a subset of computing assets of the one or more computing assets, which includes computing assets with service association scores that exceed a service association threshold;
  determine computing assets associated with the service based on the subset of computing assets;
  receive a request for computing assets associated with the service; and
  provide the subset of computing assets in response to the received request, wherein the subset of computing assets is provided as an ordered list, the ordered list including the subset of computing assets in order from a highest service association score to a lowest service association score.

16. The one or more computer storage media of claim 15, wherein the term-score mapping includes the one or more alias terms and a set of weighted score values, each weighted score value being mapped to one alias term of the one or more alias terms; and
  wherein the computer-executable instructions, upon execution by the processor, further cause the processor to at least:
    collect service metadata associated with the service; and based on term frequency-inverse document frequency (TFIDF) analysis of the service metadata, assign weighted score values to each alias term of the one or more alias terms in the term-score mapping.

17. The one or more computer storage media of claim 16, wherein the computer-executable instructions, upon execution by the processor, further cause the processor to at least:
  receive feedback data associated with the identified subset of computing assets; and
  adjust at least one weighted score value of the term-score mapping based on the received feedback data using machine learning.

18. The one or more computer storage media of claim 15, wherein collecting metadata from
  the one or more computing assets includes collecting up-to-date metadata periodically based on a metadata collection interval; and
  wherein identifying the one or more alias terms in the collected metadata and generating the service association scores for the one or more computing assets based on the identified one or more alias terms are performed based on collecting the up-to-date metadata.

19. The one or more computer storage media of claim 16, wherein the computer-executable instructions, upon execution by the processor, further cause the processor to at least:
  generate weighted score values for the identified one or more alias terms by performing a term frequency-inverse document frequency (TFIDF) analysis of the collected metadata, and wherein the term-score mapping is generated by mapping the alias terms to corresponding weighted score values.

20. The one or more computer storage media of claim 16, wherein the computer-executable instructions, upon execution by the processor, further cause the processor to at least:
  provide the subset to an alert application that uses the service association scores and provides informative alerts to users that are responsible for functionality of the service.

* * * * *